US007548328B2

(12) United States Patent
Hult et al.

(10) Patent No.: US 7,548,328 B2
(45) Date of Patent: Jun. 16, 2009

(54) MEDIA SIZE SENSE SYSTEM AND FIRMWARE ALGORITHM FOR AN IMAGE FORMATION DEVICE

(75) Inventors: Nathan E. Hult, Wilsonville, OR (US); Lynd L. Wieman, Milwaukie, OR (US); Jos W. Jacobs, Sherwood, OR (US); Carl T. Urban, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 911 days.

(21) Appl. No.: 10/953,971

(22) Filed: Sep. 30, 2004

(65) Prior Publication Data

US 2006/0072139 A1 Apr. 6, 2006

(51) Int. Cl.
*G06F 3/12* (2006.01)
*G03G 15/00* (2006.01)

(52) U.S. Cl. ...................... 358/1.13; 399/388; 399/389; 399/390; 399/370; 399/376

(58) Field of Classification Search ................ 271/171; 347/16; 355/408; 358/1.13; 399/370, 376, 399/386, 411, 708, 710, 388–390
See application file for complete search history.

(56) References Cited

U.S. PATENT DOCUMENTS

| | | | | | |
|---|---|---|---|---|---|
| 5,305,020 | A | * | 4/1994 | Gibbons et al. | 347/177 |
| 5,420,669 | A | * | 5/1995 | Imada | 399/16 |
| 5,689,759 | A | * | 11/1997 | Isemura et al. | 399/45 |
| 5,738,457 | A | * | 4/1998 | Ishida et al. | 400/706 |
| 5,940,106 | A | | 8/1999 | Walker | |
| 6,203,220 | B1 | * | 3/2001 | Takenoshita et al. | 400/61 |
| 6,390,703 | B1 | * | 5/2002 | Kinas et al. | 400/708 |
| 7,164,881 | B2 | * | 1/2007 | Donovan | 399/389 |
| 2003/0133734 | A1 | * | 7/2003 | Sugimoto | 399/389 |
| 2005/0249534 | A1 | * | 11/2005 | Donovan | 399/389 |

* cited by examiner

*Primary Examiner*—Twyler L Haskins
*Assistant Examiner*—Dennis Dicker
(74) *Attorney, Agent, or Firm*—Oliff & Berridge, PLC

(57) ABSTRACT

An image formation device having computer readable instructions that alleviate the necessity of the user to enter the correct page size into the image formation device. The computer readable instructions contain, among other things, a look-up table, or map, of known print media dimensions the image formation device is able to handle. The size of the media loaded into the image formation device is detected and assigned a value according to the look-up table, or map, of the computer readable instructions. The value is compared to the known types of media that are supportable by the printer. These types of media are grouped into predetermined categories according to their respective width dimensions. A determination of whether the image formation device performs a function is made based on the comparison of the converted value to the predetermined group of media.

16 Claims, 13 Drawing Sheets

| ZONE# | # | DESIGNATION | ORIGIN | WIDTH | LENGTH | MARGIN | LENGTH MARGIN | 1 | 2 | 3 |
|---|---|---|---|---|---|---|---|---|---|---|
| | 1 | A | US | 215.9 | 279.4 | | ISO | | | |
| | 2 | LEGAL 14 | US | 215.9 | 355.6 | | ISO | | | |
| | 3 | US FOLIO | US | 215.9 | 330.2 | | ISO | | | |
| 1 | 4 | A4 | EURO/ASIA | 210 | 297 | | ISO | | | |
| | 5 | EXECUTIVE | US | 184.15 | 266.7 | | ISO | | | |
| | 6 | B5 JIS | JAPAN | 182 | 257 | | ISO | | | |
| 2 | 7 | B5 ISO | EURO | 176 | 250 | | ISO | | | |
| 3 | 8 | EUROPEAN C5 ENVELOPE | EURO | 162 | 229 | | ISO | | | |
| 4 | 9 | A5 | EURO | 148 | 210 | | ISO | | | |
| | 10 | STATEMENT | US | 139.7 | 215.9 | | ISO | | | |
| | 11 | A7 ANNOUNCEMENT ENVELOPES | US | 133.35 | 184.15 | | 12.5 MM | | | |
| 5 | 12 | JAPANESE CHOUKEI 3 GOU | JAPAN | 120 | 235 | | 12.5 MM | | | |
| | 13 | #5 1/2 BARONIAL ENVELOPE | US | 111.125 | 142.88 | | 12.5 MM | | | |
| | 14 | EUROPEAN DL | EURO | 110 | 220 | | 12.5 MM | | | |
| | 15 | A6 | EURO | 105 | 148 | | ISO | | | |
| 6 | 16 | US #10 | US | 104.775 | 241.3 | | 12.5 MM | | | |
| | 17 | US MONARCH | US | 98.425 | 190.5 | | 12.5 MM | | | |
| | 18 | US #6 3/4 ENVELOPE | US | 92.075 | 165.1 | | 12.5 | | | |
| 7 | 19 | CHOU 4 GOU | JAPAN | 90 | 205 | | 12.5 | | | |
| 8 | 20 | 3 X 5 CARD | US | 76.2 | 127 | | ISO | | | |

FIG. 2B

| Paper Size Table |
|---|
| Letter |
| A4 (metric) |
| Legal |
| Executive |
| Folio |
| 3"x 5" Index Cards |
| B5 Iso (metric) |
| A5 (metric) |
| A6 (metric) |
| Statement |
| #6-3/4 Env |
| #10 Env |
| #5-1/2 Bar Env |
| Monarch Env |
| 6x9 Env |
| A7 Env |
| C5 Env |
| DL Env |
| 3 Gou Env (metric) |
| 4 Gou Env (metric) |

FIG. 7B

MEDIA SIZE SENSE SYSTEM AND FIRMWARE ALGORITHM FOR AN IMAGE FORMATION DEVICE

BACKGROUND OF THE INVENTION

1. Field of Invention

This invention is directed to systems and methods for sensing media size in an image formation device.

2. Description of Related Art

It is important for a printer to recognize the size of the media loaded in the printer that data is to be printed on. Typically, the most basic form of media size sensing is to measure the length of the print media, such as paper, as the media travels through the print path of the printer using position/size sensors. Almost all printers have this form of media length sensing. A problem with detecting only the paper length is that it is assumed that the paper is of a standard size (length and width). It is further assumed that the user knows the width of the media loaded in the printer. However, as there are often many different page sizes that may be sensed, the more sizes the printer is capable of using, the greater the chance the user may incorrectly choose the size of the media loaded in a paper tray of the printer, which can lead to undesired results. For example, choosing an incorrect media size can lead to ink being deposited outside of the boundary of the chosen media.

U.S. Pat. No. 5,940,106 discloses several known methods of determining the width of print media. For example, both reflective photodiode and capacitor sensor methods of media sensing rely on the position of the printer carriage to determine the media width. U.S. Pat. No. 5,940,106 also discloses a resistive sensing system for determining the size of print media loaded in a printer. The system includes sliding mechanical length and width size adjusters within a paper tray into contact with the edges of the print media. These length and width size adjusters each have sliding contacts which engage an energized conductive strip at a location corresponding to the position of the size adjusters. The printer has a controller that interprets an electrical signal received from the sliding contacts to determine the size of the print media loaded into the printer.

In a standard paper tray, multiple sensors with flags are sometimes used. The flags are set by moving side guides, or length backstops in the tray, which have discreet sensor settings for each different media size. Such flag systems function adequately for trays containing standard size paper, such as 8.5"×11.5" and A4. However, when printing on a non-standard page size or custom media, such known systems may produce undesired results.

To avoid these problems, printers, copiers, multi-function devices, and the like, often include a multiple purpose tray (MPT), i.e., the tray that folds up into the front of the printer which usually only holds about 100 sheets of paper. This tray is sometimes also referred to as a “by-pass tray”. Most often, custom media is only received into the printer from the MPT. Custom media, may be of any type of substantially flat material. For example, custom media may include paper, card stock, transparencies, Mylar, foils, fabrics, and the like. The MPT is unique in printers in that it is usually the only location where a user may load all media types, media sizes, custom media, as well as light and heavy weight media.

In a basic MPT there is often no size sensing capability. Rather, the user is required to manually enter the size of the media being loaded into the MPT via an input device usually located on a front panel of the printer. The problem with this method is that if the printer has a plurality of page size settings to choose from the user might have to scroll through all of the settings before selecting the desired paper size setting. Frequently the user does not select or enter the page size at all, but rather merely loads the media into the MPT and walks away from the printer. If the correct page size setting is not selected, then the printer will not run and the print job will remain unexecuted.

Custom media offers even larger problems in that a user often must input the actual dimensions of the media. Thus, not only is the user not likely to enter the media dimensions, if the user does try to enter the dimensions, the user often must enter the dimensions in a format other than the format known to the user resulting in the user being required to convert dimensions from a known format to an unknown format. For example, many users have difficulty converting known fraction dimensions into decimal units and vice versa.

Having an incorrect media size setting selected, or entering an incorrect dimension, can result in printers printing outside the intended print area. Ink that is not transferred to the media remains in the printer where it can do damage to the printer or spoil future printouts.

SUMMARY OF THE INVENTION

This invention provides systems and methods that alleviate the necessity to manually enter media dimensions into an image formation device, such as a printer, photocopier, or multi-function device.

In an exemplary embodiment of this invention, a potentiometer paper width measuring system is attached to side guides disposed on the MPT of a printer or image formation device. As the side guides move in and out, according to the width dimensions of the print media in the MPT, the output of the potentiometer changes. The potentiometer output or “readings” are converted to a width value and the value is assigned to a predetermined “range” or “zone”. This “range” or “zone” is, for example, the allowable width of the media, i.e., the allowable printable surface of the media detected in the MPT.

For example, when a print job is sent to a printer the page size is included with the image file of the print job as part of the page content in a page description language (PDL). A PDL is a method of describing a printed page in a printer independent format that may be used to establish an interface between a print driver and a print server, or printer. No single standard page description language presently exists, and as a result, a number of industry standards have emerged such as PostScript™.RTM., Hewlett Packard™ Printer Control Language, Interpress™, and the like.

In another example, in a copier, the page size may be included or inferred based on the size of the print media loaded in the copier. In this example, the desired page size may be determined through the size of the image scanned. Thus, in this invention, determination of page size is not limited to an imbedded page size included in a print file, but may be determined by any data providing image data.

In an exemplary embodiment, the width of the print media to be used for the print job is checked against the media loaded in the image formation device to make sure the side guides are in an acceptable “range” or “zone”. This is accomplished by comparing the potentiometer readings to a look-up table, or map, resident in the image formation device where the readings are assigned a value corresponding to the media width. The value is compared to the page size included in the incoming image file of the print job. If the “range” is determined to be acceptable, the image is printed according to the page size in the image file, or print job, and sent to the image formation device. When the first sheet is run (printed), the length of the sheet is checked to verify the page size. In the event the page size in the image file does not correspond to the media loaded in the MPT, a message is generated to notify the user of an incompatible media size and the print job is stopped.

One aspect of this invention provides computer readable instructions that are installable in a image formation device that alleviates the necessity of the user to enter the correct page size into the image formation device. The computer readable instructions contain, among other things, the look-up table, or map, of known print media dimensions the image formation device is able to handle. The computer readable instructions also alleviate the necessity of the user to enter the width and length of the page size for custom media. Rather, the computer readable instructions allow the user to merely load the media in to the image formation device and the computer readable instructions take care of the rest. Thus, the user is protected against selecting an incorrect media size or type which may result in unwanted ink being left behind in the printer causing service and printing difficulties. As used herein, computer readable instructions include, for example, software, firmware, hardware, and the like.

Another aspect of this invention provides computer readable instructions that, among other things, communicate with a user's PC, or other data storage device. The computer readable instructions enable a message to be sent to the user notifying the user in the event the print job requires media that is not loaded in the selected print device.

In another aspect of this invention, media being loaded into the MPT is immediately detected and assigned a value according to the look-up table, or map, of the computer readable instructions. The value is compared to the known types of media that are supportable by the printer. These types of media are grouped into predetermined categories according to their respective width dimensions. In other words, media having similar width dimensions, such as 8.5"×11", 8.5"×14" and A4, are grouped together as having a width within the same "range" or "zone". Once the media loaded in the MPT has been detected and assigned a value, media having a width in that "zone" are displayed to the user. The user may then select and/or verify the specific type of media loaded in the MPT.

BRIEF DESCRIPTION OF THE DRAWINGS

Various exemplary embodiments of the systems and methods of this invention will be described in detail with reference to the following figures, wherein:

FIG. 2B is a chart showing paper width zones in a printer having twenty types of print media available;

FIG. 7B is a table of paper sizes;

DETAILED DESCRIPTION OF PREFERRED EMBODIMENTS

In various exemplary embodiments, this invention provides systems and methods that include pre-measuring the width of the print media loaded in a paper tray of an image formation device to distinguish between many different standard types of media having different dimensions. In various exemplary embodiments, this invention can also be applied to custom media sizes. Such systems and methods not only prevent a user from having to confront the difficulties associated with a confusing number of available page sizes, which can lead to service issues with a printer, but also make it very easy for the user to use the image formation device most effectively. In an exemplary embodiment of the invention, the systems and methods may be implemented in the MPT of a printer. However, the systems and methods of this invention may also be implemented with any type of paper tray in image formation devices.

In an image formation device it is important to know the correct media or page size that an image is to be printed upon. If an image is sent to an image formation device that is larger than the paper size loaded in the image formation device, or is outside of the printing area of the loaded/selected media, certain problems may result. For example, the resulting print job will most likely leave ink behind in the image formation device. If this happens often, then there will be excess ink left behind in the image formation device causing maintenance and image formation problems for the user.

Figure 1:
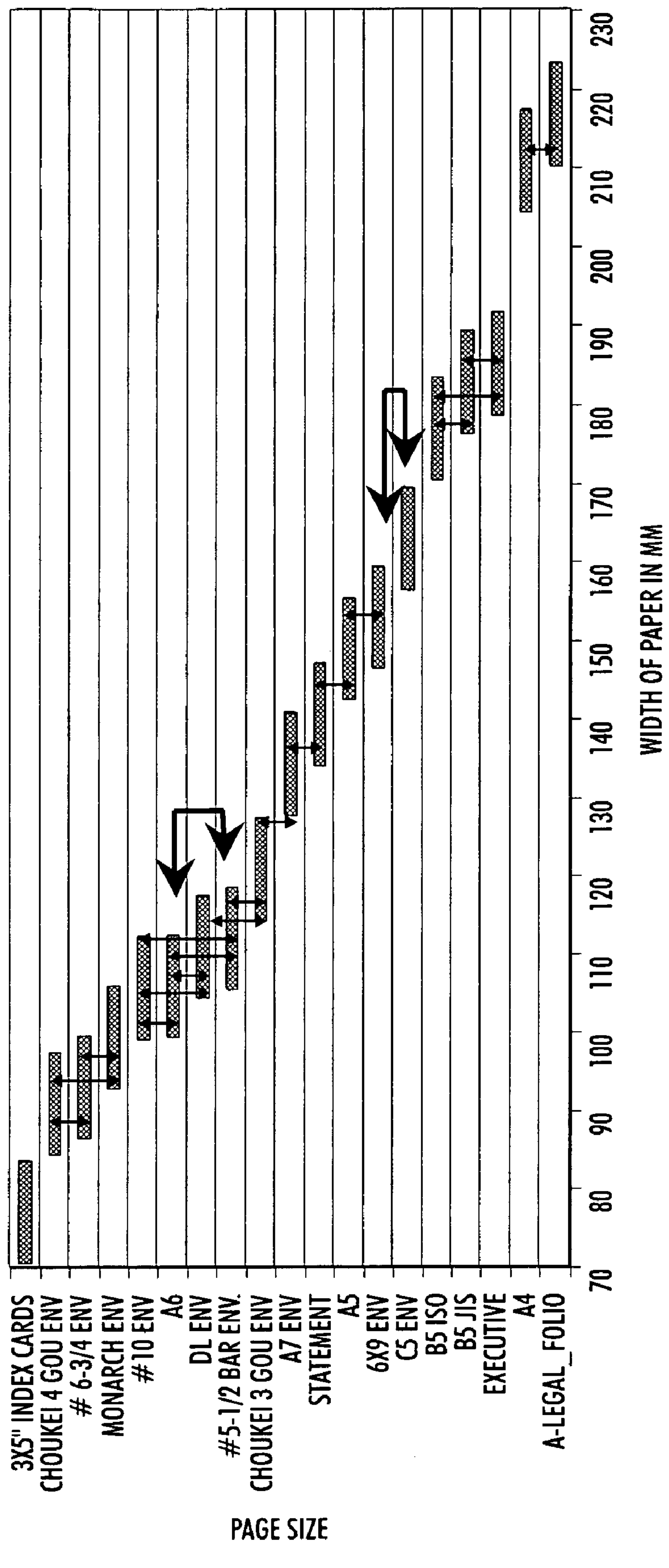
FIG. 1 is a chart illustrating a potential for ink to be left behind due to incorrect page size selection.

In an exemplary embodiment of the systems and methods of this invention, page size sensing reduces the potential for user error that may degrade print quality and the useful life of an image formation device. FIG. 1 is a chart illustrating a potential for ink to be left behind in an image formation device as a result of incorrect page size selection. As shown in FIG. 1, the zone, (described later) of each of a plurality of media widths is indicated by a white bar. For example, 3"×5" index cards have a zone of about 72 mm to about 84 mm of paper width. The vertical arrows indicate the page sizes that overlap in the width direction. For example, an A5 envelope overlaps with a 6"×9" envelope in the width direction from about 145 mm to about 155 mm. The horizontal arrows indicate the standard page sizes having an overlap that are so close in length that a user cannot accurately distinguish between the two page sizes. In other words, a user often cannot readily distinguish between certain two of the page sizes by a width measurement alone in the printer. For example, a 6"×9" envelope and a C5 envelope are shown as being so close in length that a user cannot accurately distinguish between the two sizes visually.

The systems and methods of this invention also provide an inexpensive way to detect media sizes available in an image formation device, through computer readable instructions resident in the image formation device. The computer readable instructions make it very easy for the user send any print job, including custom print jobs, to the image formation device without the risk of contaminating the image formation device, or fouling the print out, with excess ink that was not applied to the print media due to improper media selection.

Although the computer readable instructions of this invention will be described in the preferred embodiments using "firmware", software, hardware, and the like, are also contemplated to be within the scope of this invention. Additionally, although the invention will be described with reference to a printer, other image formation devices such as photocopiers, multifunction devices, and the like, are also contemplated for use with the systems and methods of this invention.

Figure 2A:
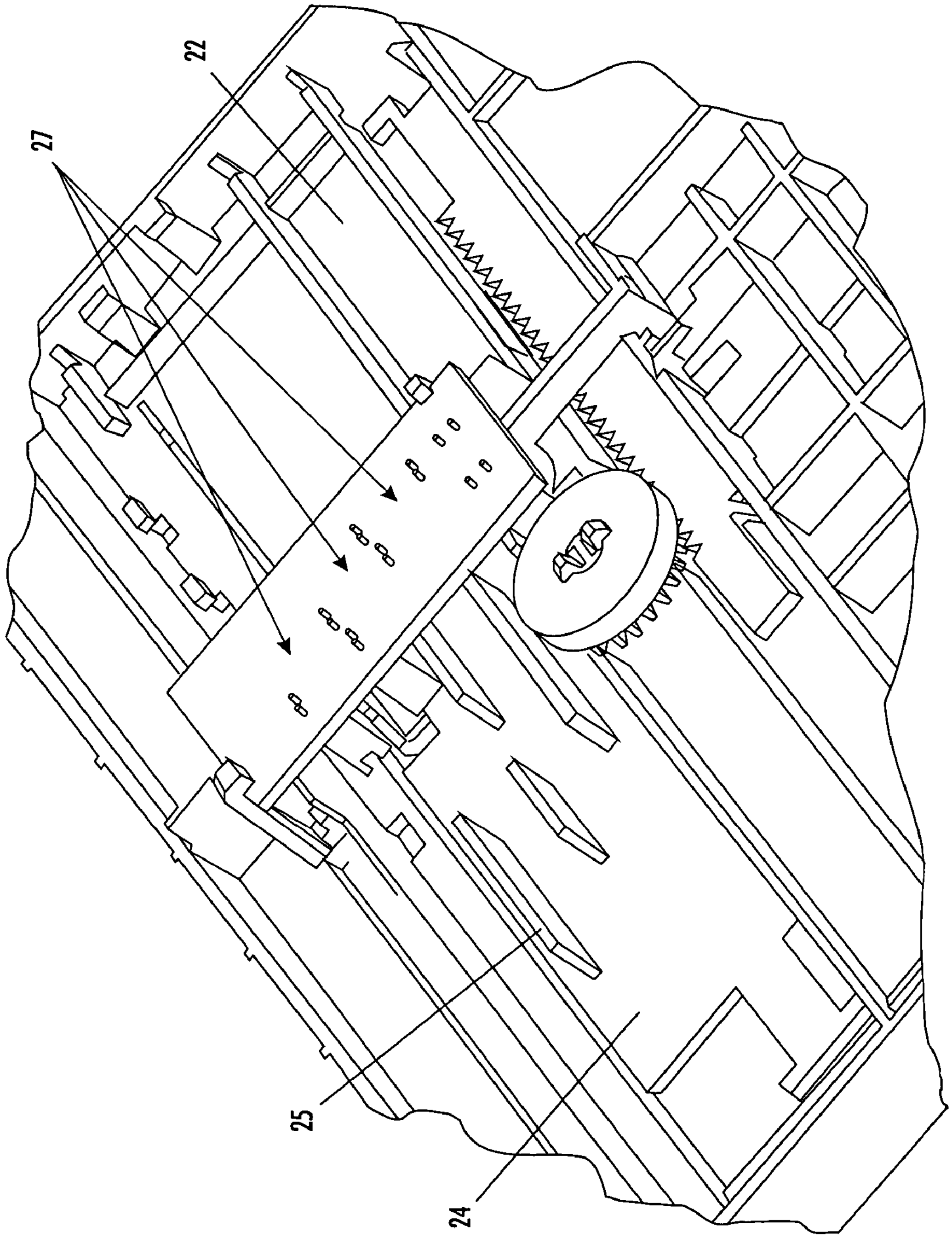
FIG. 2A shows a multi-purpose tray having a three sensor system for paper size detection, according to an exemplary embodiment of this invention.

FIG. 2A shows a multi-purpose tray having a three sensor system for paper size detection according to an exemplary embodiment of this invention. As shown in FIG. 2A, an MPT 22 has a side guide 24 slidably attached thereto. The side guide 24 has one or more flags 25 attached directly thereto to minimize tolerance "stack-up". For example, "stack-up" of tolerances results when there are multiple dimensions between two features, the more dimensions the more "stack-up" may occur. In this embodiment, the flags 25 are attached to the side guide 24 which results in less of a stack-up, as opposed to having the flags as a separate part. For example, in this embodiment, the flag 25 is attached directly to the left side guide 24. Three sensors 27 are associated with the flags 25 are attached to side guides in a paper tray. (See FIG. 2A) By having the three sensors 27, there is the possibility to have eight different detection states (i.e., $2^3$). The flags 25 are used to measure the width of the media when inserted in the MPT 22. The measured, or determined, width is then placed in a predetermined width "zone", as will be explained below.

FIG. 2B is a chart showing paper width zones in a printer having twenty types of print media available. As shown in FIG. 2B, a plurality of page sizes may be available in a printer that can be categorized into eight such "zones". The use of such "zones" helps the user to choose the correct media without having to know or enter the actual page dimensions which may lead to errors. For example, having to choose from twenty different types of print media often results in frequent errors in page selection by the user if the page size is determined only by its length because many page sizes have similar lengths, as may be seen in FIG. 2B.

Furthermore, because the paper cut tolerance may be up to 3 mm on a 355 mm long page, and because of the variance in the length measurements, there is an additional potential to select an incorrect page size. The use of "zones" as provided in this invention narrows the choices of media sizes, thus reducing the potential for mistakenly selecting the wrong page size. In an exemplary embodiment, the zones are grouped together according to those types of media having similar widths.

For example, Zone 1 includes media designated as A, Legal 14", US Folio, and A4. Each of these types of media has a width dimension that is 1 mm, or less, different from the other. Thus, correct determination of the media would be extremely difficult without knowing the length respective length measurement of each media type.

Figure 3A:
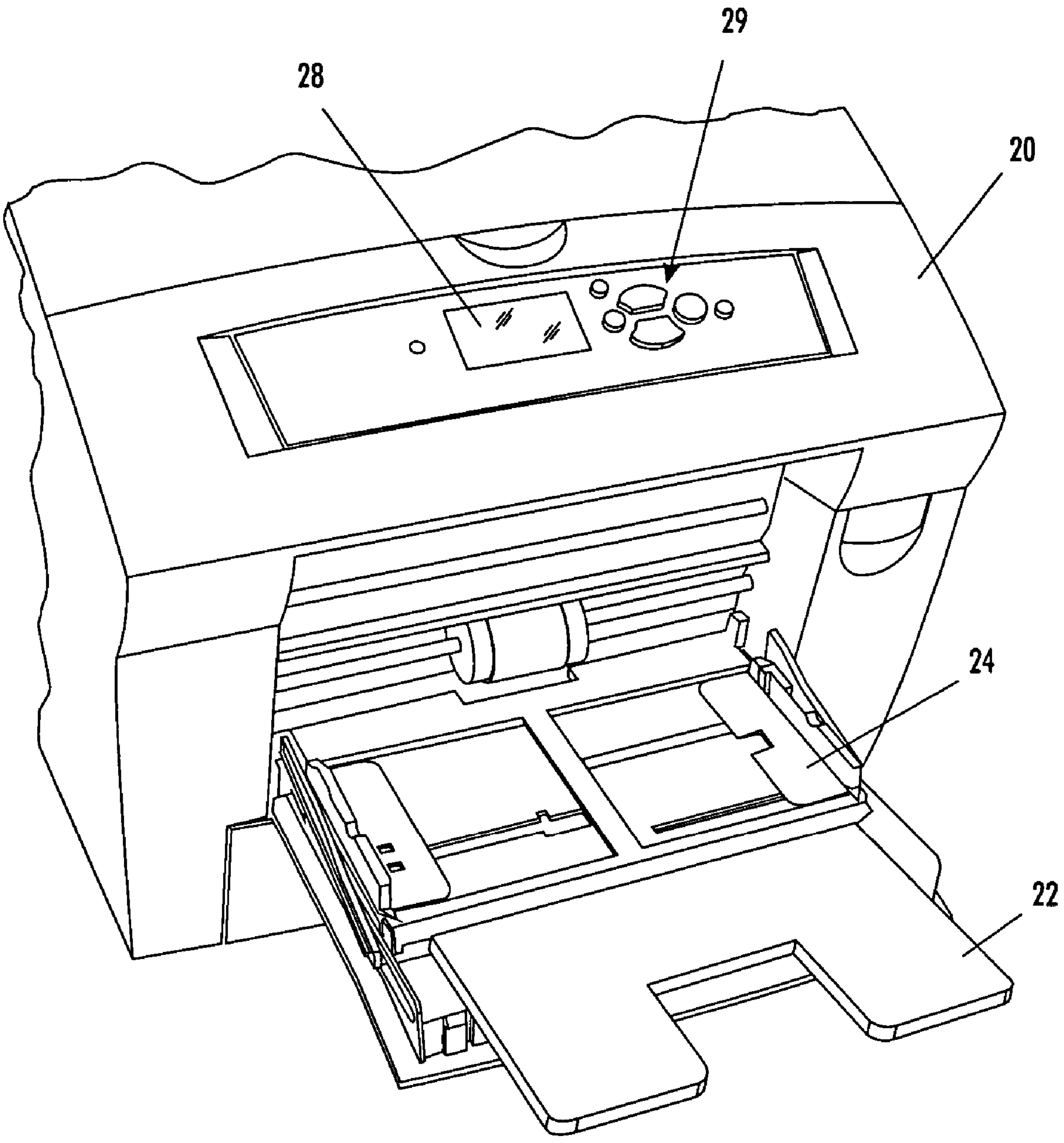
FIG. 3A shows a perspective view of a printer having a MPT with width sensing side guides.
Figure 3B:
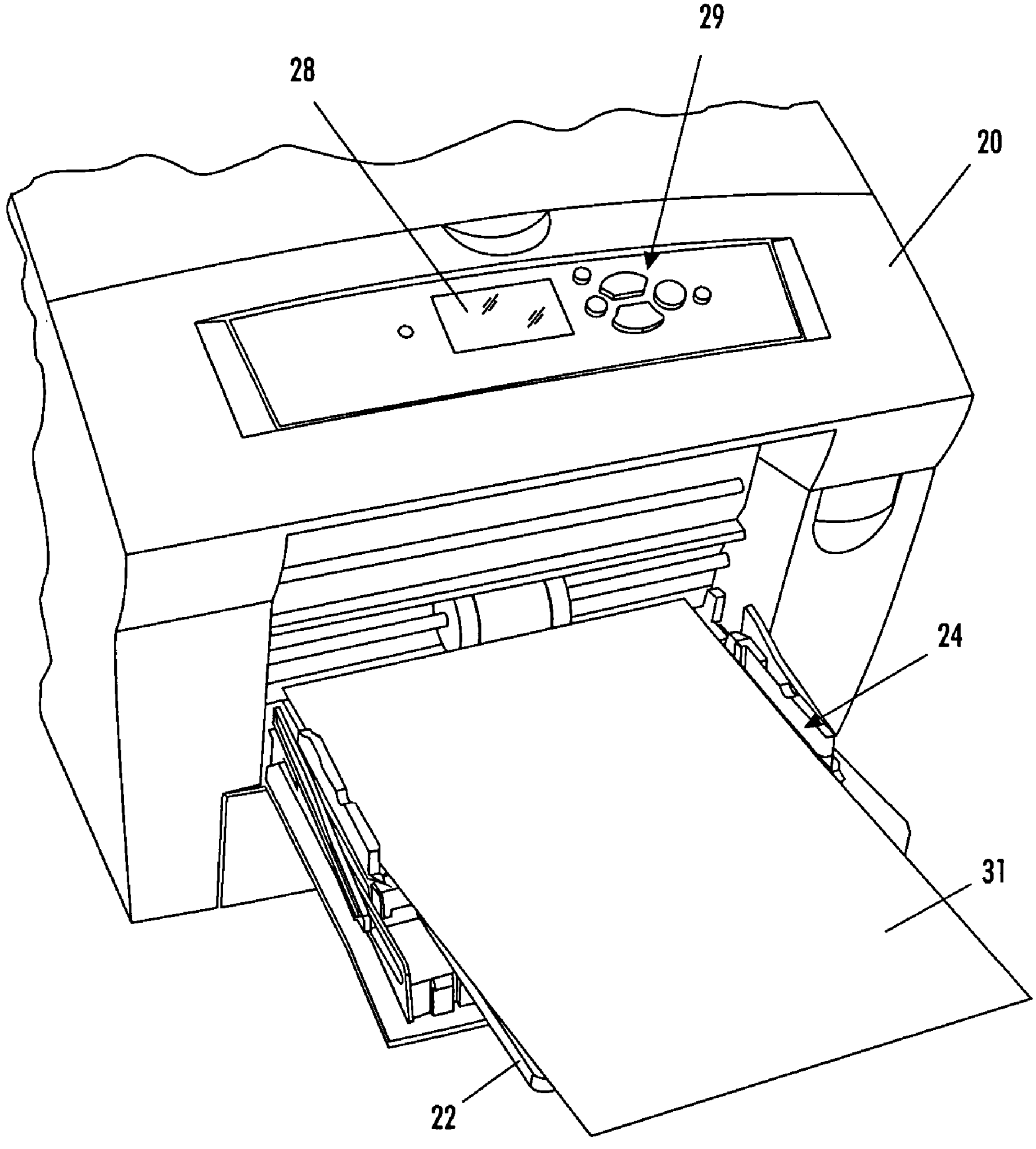
FIG. 3B shows a perspective view of a printer having print media loaded in the MPT.

FIG. 3A shows a perspective view of a printer having a MPT with width sensing side guides. As shown in FIG. 3, a printer 20 has a MPT 22 that includes adjustable side guides 24. A sensor 30, such as potentiometer or variable resistor, (see FIG. 4) is associated with the side guides 24 for measuring the width of the media 31 (FIG. 3B) loaded in the printer 20 based on the position of the side guides 24. The printer 20 also includes a display panel 28 and control keys 29 for selecting among options displayed on the display panel 28.

In this exemplary embodiment, when the media 31 is loaded into the MPT 22, the side guides 24 are adjusted in the MPT 22 to a point of contact with the outer edges of the media 31 in the width direction. The position of the side guides 24 is detected by the sensors 30. Because the MPT 22 is a fold out tray there is not the possibility of including a length sensor. Furthermore, due to size limitations of conventional MPTs (approximately 10.5" in length), many types of media may be longer than the MPT. Therefore, placement of a length sensor on the MPT may be impractical.

As shown in FIG. 3B, the width of the print media 31 loaded into the MPT 22 is detected by the sensors 30 according to the position of the side guides 24. In this embodiment, because a potentiometer is used as the sensor 30, the potentiometer output or "readings" are converted to a width value of the media 31 loaded in the MPT 22 and the width value is assigned to a predetermined "range" or "zone". The width value of the print media 31 loaded in the MPT 22 is compared to the types of media that are known to be supportable by the printer (see FIG. 7B). These types of media have been grouped into predetermined categories according to their width dimension and listed in an order of frequency of use. For example, media having similar width dimensions, such as 8.5"×11", 8.5"×14" and A4, are grouped together as having a width within the same "range" or "zone". Once the media 31 loaded in the MPT 22 has been detected and assigned a value, all such media having a width in that "zone" may be displayed to the user on the display 28 (see FIG. 6). The user may select and/or verify the specific type of media loaded in the MPT through the control keys 29.

The use of the potentiometer type sensor 30 provides a discreet reading which can be converted to an exact width measurement of the media 31. However, according to the systems and methods of this invention, a range is still applied to the potentiometer reading as there are a variety of sources of error that must be accounted for correct media selection. One such source of error is variation among printers as all parts are not exactly the same. For example, printer variation was measured over a sample population of printers and the error was estimated to be approximately +/−2.5 mm. The printer variation error represents variations in the media width measuring system. There are many sources of error that contribute to the amount of variation among printers, such as variations in manufactured potentiometers, e.g., the electrical resistance may vary slightly among the manufactured parts. There is also variation in the mechanical placement of the potentiometer relative to the entire mechanical system that moves the potentiometer back and forth. Additional error may be introduced due to the "cut tolerance" of print media. For example, the U.S. standard cut tolerance for a standard paper width is +/−1 mm, but the European ISO standard is +/−2 mm. Therefore, the systems and methods of this invention account for the worse case error, i.e., +/−2 mm.

Another source of error that must be accounted for is the error induced by the user of the device. For example, in a MPT 22 the user must adjust the side guides 24 snugly against the media. However, not all users may adjust the side guides 24 in the same manner. Thus, in an embodiment of this invention, an additional −3 mm of potential error in side guide placement is taken into consideration. It is also important to note that the error is not two sided. If the user adjusts the side guides 24 to a position narrower than the width of the media, then the media will buckle or bind. However, the MPT 22 will still function properly if the side guides 24 are set wider than the actual width of the media. Therefore, if the side guides 24 are set wider, the actual width of the media will be smaller than the width determined by the side guide placement so the error is a negative number only. If these errors totaled, the "range" or the "zone" of the media width may be determined. In the above example, the range would be about +4.5 mm to about −7.5 mm. One skilled in the art will recognize that the amount of potential error taken into consideration in side guide placement may be varied from that disclosed without departing from the scope of the invention.

Figure 4:
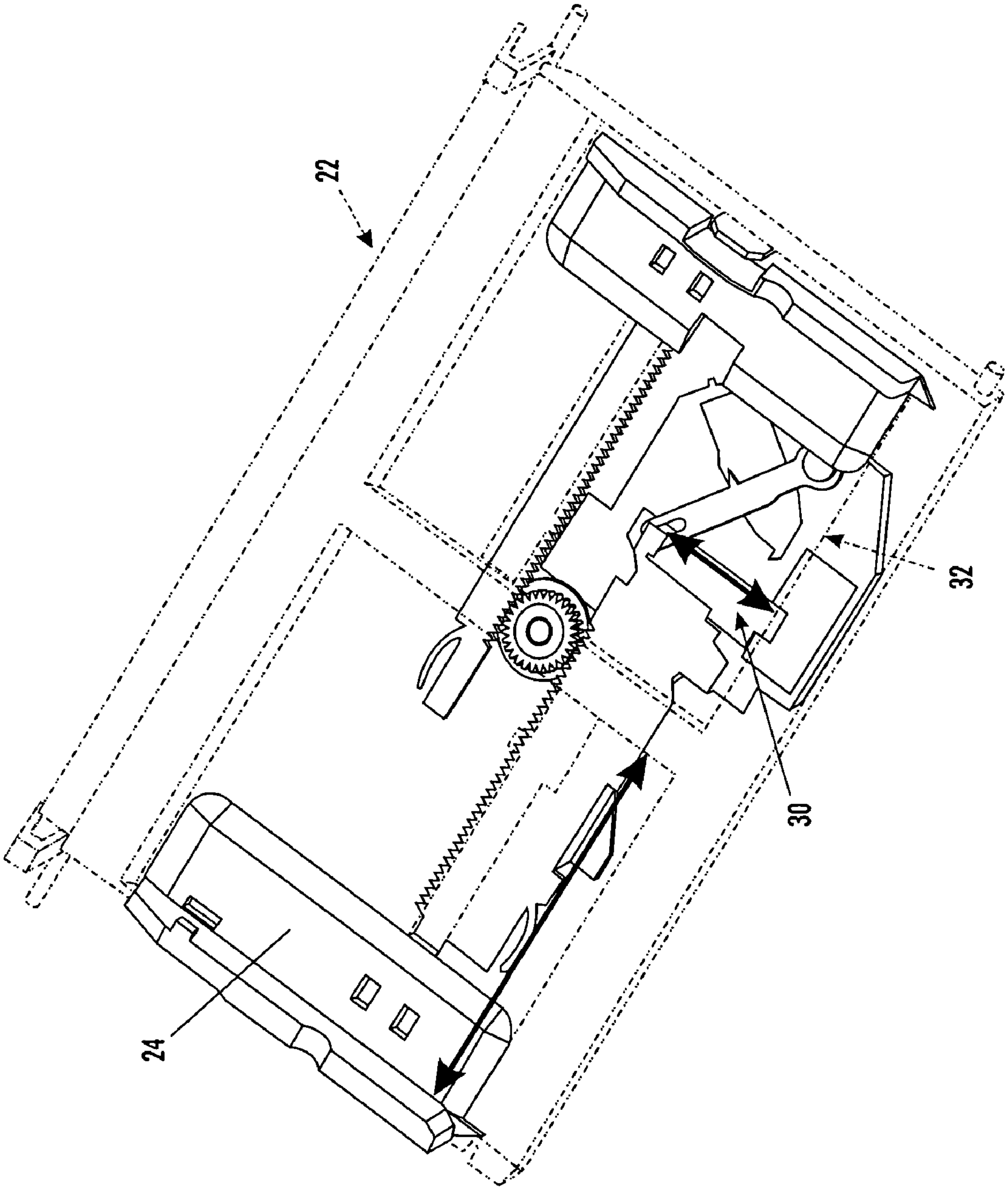
FIG. 4 shows a perspective view of a MPT with width sensing capabilities.

FIG. 4 shows a perspective view of a MPT with width sensing capabilities. As shown in FIG. 4, the MPT 22 may include a small variable resistor or potentiometer-type sensor 30. In an exemplary embodiment, the sensor 30 has about 32 mm of travel. The potentiometer 30 is attached to the potentiometer assembly 32 which is attached to the MPT 22. An actuator in the potentiometer assembly 32 is biased against a rail feature attached to the side guide 24. In this exemplary embodiment, there is approximately 70 mm of sensor travel required to measure all media sizes. The 70 mm of travel is calculated by subtracting the smallest media width size (76.2 mm) from the largest media width size (215.9 mm) divided by 2 (movement of two side guides). As shown in FIG. 4, the sensor 30 detects the width of media (not shown) loaded in the MPT 22. An advantage of this exemplary embodiment is an ability to provide a variable reading compared to the "discreet zones" shown in FIG. 2A using the three sensor system.

The potentiometer-type size sensing system shown in FIG. 4 works similarly to the eight-zone system shown in FIG. 2A. However, in this exemplary embodiment, there are no longer "discreet zones" as in the eight zone system. Rather, there are "variable zones" comprising the amount of potential error of the measurement including, for example, the variability of the size sensing system among printers, the tolerance of the paper cut width (which can be up to +/−2 mm), and how accurately the user pushes the side guides 24 against the media 31.

As discussed above, when the media is first run through the printer 20, a length measurement is made. The length measurement can measure to about +/−5 mm including the page size variation. For example, FIG. 1 shows two sets of media sizes that are in the same "zone" and also have a length that is within 5 mm of each other (indicated by the horizontal arrows). Because the lengths are so similar, the typical image formation device can not distinguish between them. However, the two overlaps are often not of concern as they are uncommon page sizes. Also, in both cases shown in FIG. 2B, one of the media size is metric (European) and the other media size is US, or English. Therefore, the possibility of a user incorrectly selecting one of those two sizes is minimal.

In the case of custom media, however, there is an even greater potential for error. To address this problem, the systems and methods of this invention provide for increasing the margin size, i.e., the maximum size of image that can be created on the page. A printer may set a standard margin at about 5 mm by default. For custom media, a printer incorporating firmware according to this invention may increase the margin to about 12.5 mm for custom media. By increasing the margin, the risk of leaving ink behind in the printer as a result of the print process is reduced. Because of the inherent difficulties in using custom sized media, such as manually measuring the media, converting the measured format to a format accepted by the printer (if different), and manually entering that number into the printer, the margin size in increased to prevent leaving ink behind.

Figure 5:
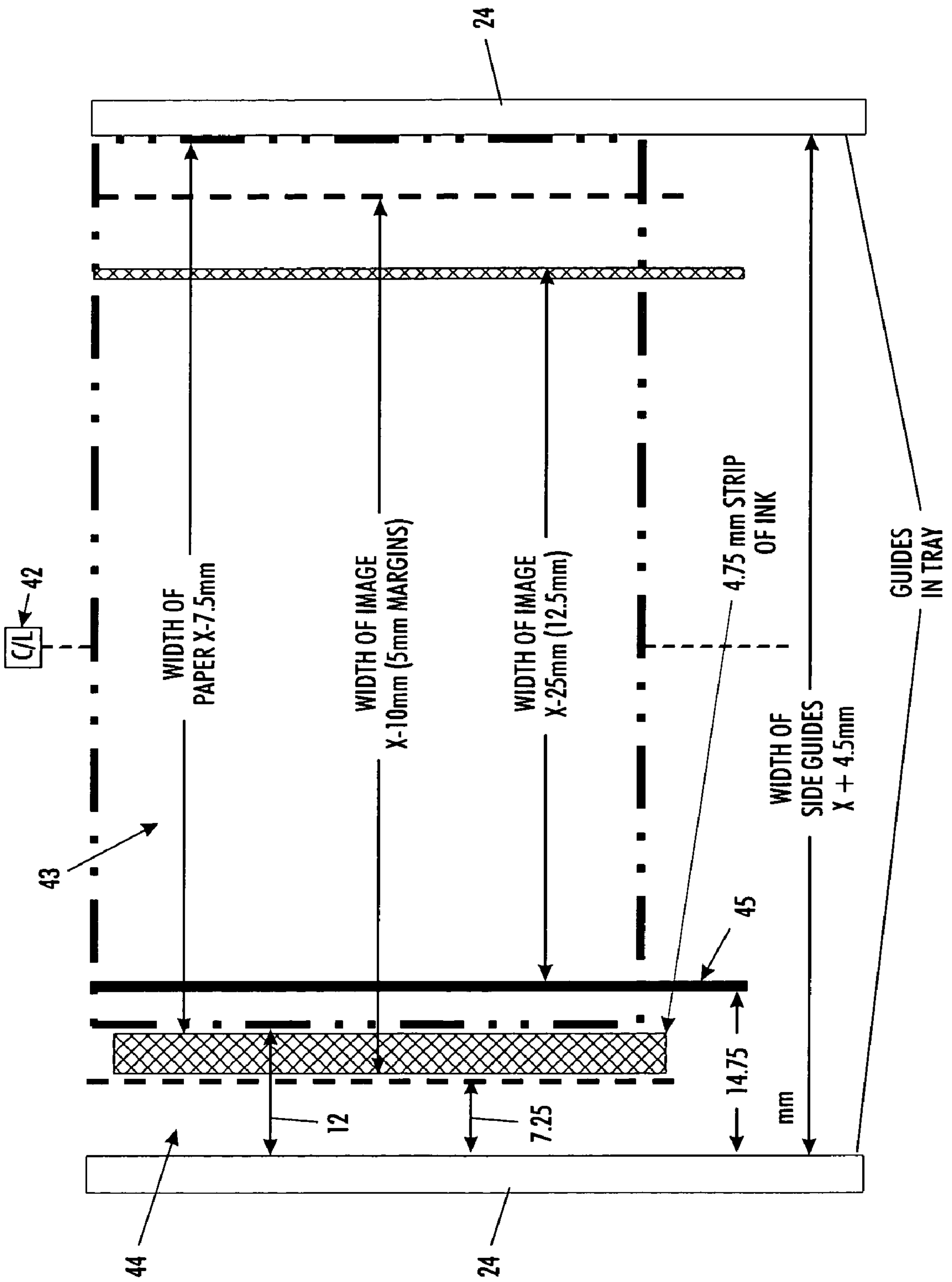
FIG. 5 illustrates an example a result of selecting an incorrect page size for custom media.

FIG. 5 illustrates an example of a result of selecting an incorrect page size for custom media. As shown in FIG. 5, an image sent to a printer is "X" wide. The largest allowable guide setting, "Width of Side Guides," would be X+4.5 mm. However, in this example an error was made measuring the sheet of paper and the width of the paper is actually X−7.5 mm. Also, when the media (indicated by the double dashed line) was loaded into the printer the media was totally biased to the one side against the right side guide 24. In most printers, the print job image is centered about a centerline 42. Therefore, in this example, the single dashed lines (with 5 mm margins) show that the image is 7.25 mm from the side guide 24 and the media, indicated by the double dashed line is 12 mm over from the side guide 24.

Thus, in this example, there is a 4.75 mm wide strip of ink (indicated by the shaded area in FIG. 5) that may be left behind in the printer. However, according to this embodiment of the invention, for custom media the firmware sets the margins 45 larger (at 12.5 mm). In this case, the lines 45 represent the shifted image. Thus, the edge of the margin is now at 14.75 mm from the side guides 24. Therefore, no ink will be left behind in the printer.

The above exemplary embodiment described using FIG. 5 can also illustrate that the firmware according to the systems and methods of this invention is also applicable for standard media sizes. For example, standard page sizes may have the same tolerances for the "zone" and the same potential for the 4.75 mm ink being left behind. As shown in FIG. 1, for standard sizes, the width and length are known. Therefore, preventing error in page size selection can be avoided. However, the correct page size must still be verified by measuring the length of the paper. Thus, one sheet of paper might be run and the potential for a worst case strip of 4.7 mm wide of ink could be left behind. However, the systems and methods of this invention can determine that the wrong size of media was run, by measuring the width and the length and comparing it to a known media size, and will not run anymore until a larger size is run to clean the ink from the imaging device. In contrast, in conventional image formation devices, the ink would continue to be left behind and the print job would continue to run to completion. Thus, if the print job were a multiple copy job there is a potential for a large volume of ink to be left behind in the image formation device which would require the user to clean up.

In an exemplary embodiment of the systems and methods of this invention, a "zone" system is used to display the page sizes on the front panel. In conventional printing devices, the user is often required to enter the desired page size via the front panel of the printer every time media was loaded into the printer. Due to limited display space, only a few of the total number of media size selections available in the printer may be displayed. Therefore, the user is required to scroll through multiple screens to view all of the available options and/or locate the desired media size. This tedious and redundant operation often results in incorrect media size selection leading to degradation of the print job and the printer due to ink being left behind.

Figure 6:
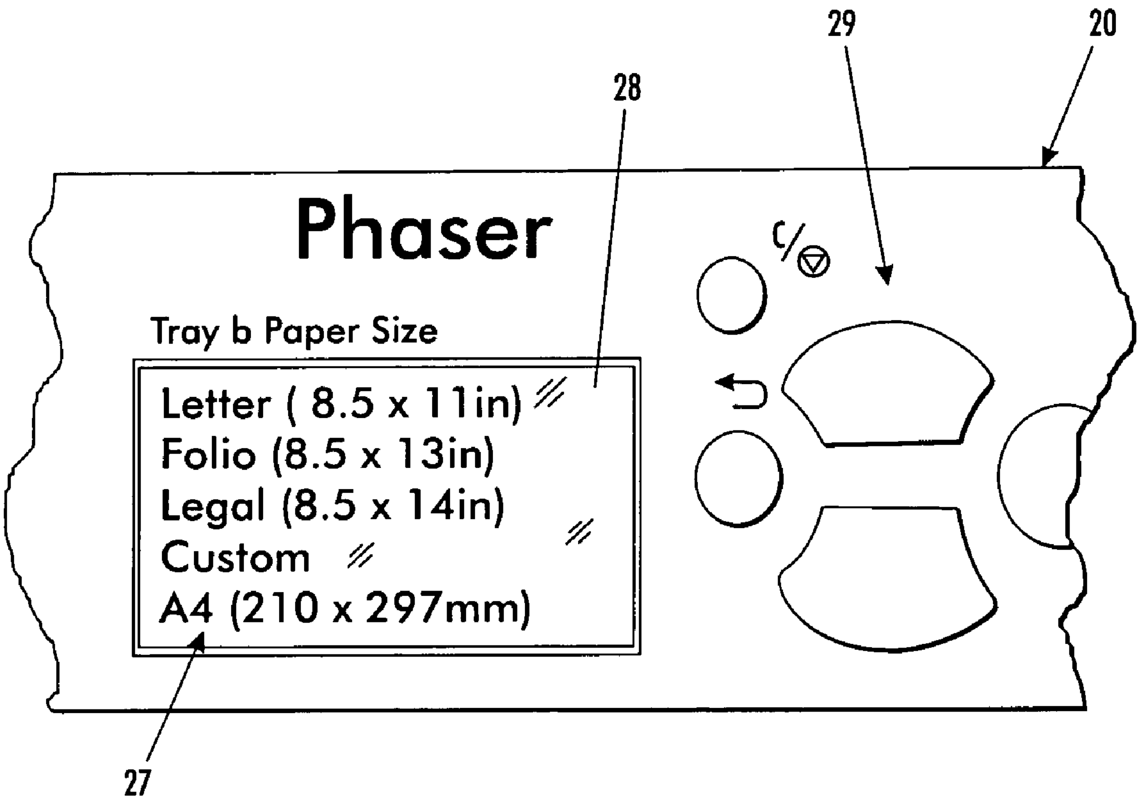
FIG. 6 shows a printer display of a predetermined group of media sizes.

FIG. 6 shows a printer display of a predetermined group of media sizes. As shown in FIG. 6, the printer 20 has a display 28 and control keys 29. In this exemplary embodiment, depending on the location of the sensor 30, there will be anywhere from 1 to 5 media sizes 27 displayed on the display 28. According to an exemplary embodiment of this invention, although only the page sizes 27 in the appropriate "zone" are displayed on the display 28 of the printer 20, the systems and methods of this invention will still try and select the correct media size on which to print based on the frequency of use of the media within the appropriate zone. Thus, the systems and methods of this invention make it much easier for the user to choose the correct size of the media loaded into the MPT 22.

Figure 7A:
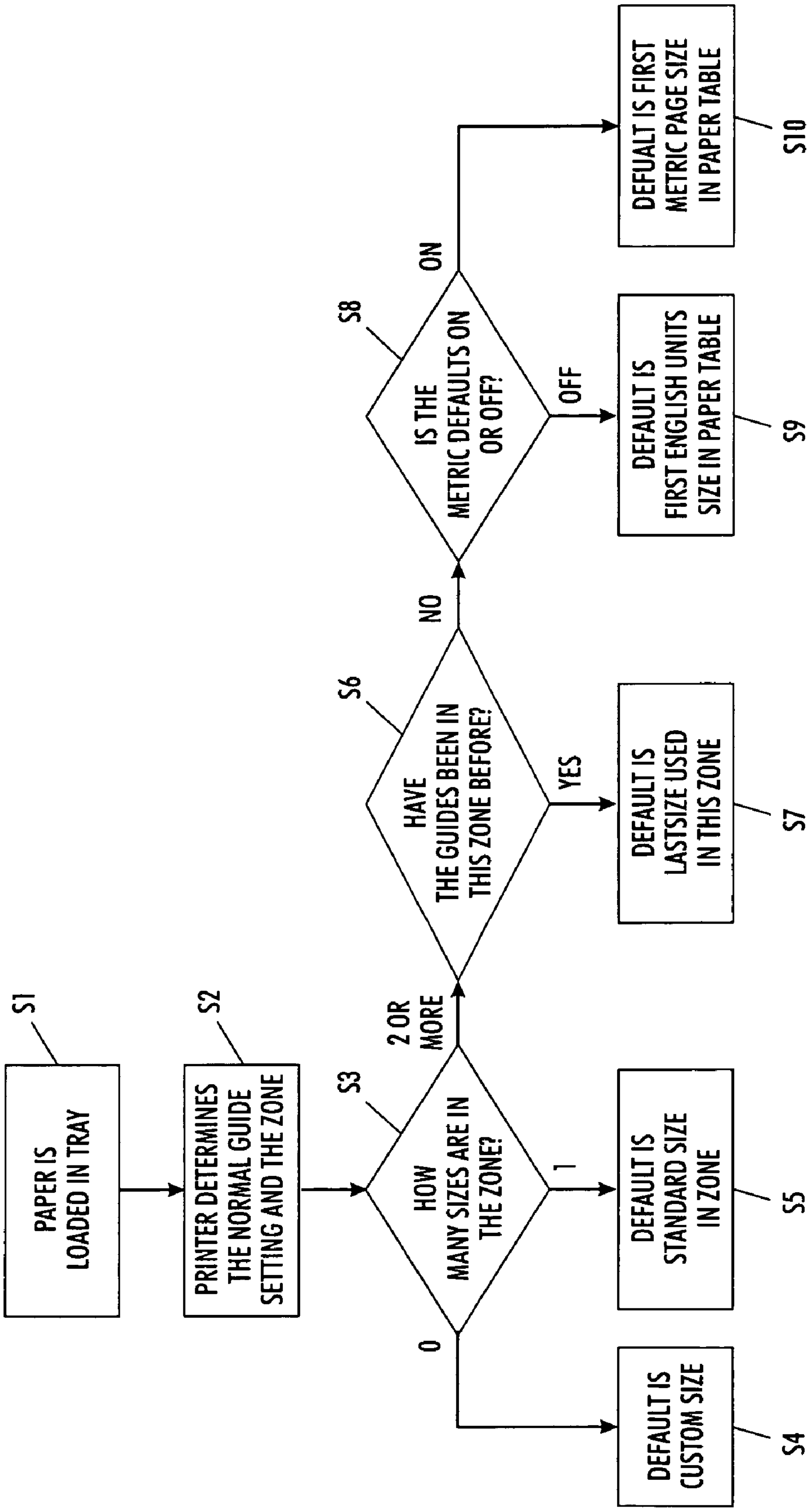
FIG. 7A is a flowchart of media size selection from a predetermined group of media, according to this invention.

FIG. 7A is a flowchart of media size selection from a predetermined group of media. As shown in FIG. 7B, the "Paper Size Table" has been ordered so the most popular media sizes are listed first. In other words, media selection within the zone is performed according to a hierarchy.

As also shown in FIG. 7A, the selected media, or paper, is loaded into a MPT at step S1. The printer 20 then determines the nominal guide setting through the detected position of the side guides 24 in a corresponding zone at step S2. Once the zone has been determined, the number of corresponding media sizes within that zone is accessed from the computer readable instructions in the printer 20 at step S3. In the event there are zero media sizes in that zone, the printer 20 defaults to a custom media size at step S4. If it is determined that there is one media size within the determined zone, it is determined that the media size is a standard size within the zone at step S5. If there are two or more media sizes within the zone, the procedure proceeds to step S6. At step S6, the systems and methods of this invention determine whether the side guides 24 have been located in this zone previously. If the side guides 24 have been in the current position previously, it is determined that the default is the last media size used in this zone at step S7. If it is determined that the side guides 24 have not been in this zone previously, the procedure continues to step S8. At step S8, it is determined whether a metric measurement default is in an ON or an OFF position. If it is determined that the metric default is OFF, the default is set to the media size in the paper table (as shown for example in FIG. 7B) first located that has English units at step S9. If it is determined that the metric defaults are ON, the procedure continues to step S10. At step S10, the default is set to the first metric page size in the paper table.

As discussed above it is inefficient for users to be required to enter the desired page size for each print job and will lead to print job and printer degradation. For example, if the user loads a #10 envelope in the MPT 22 of a printer 20 and the user walks away without selecting that size from the list of available media, the user will be unable to print on the #10 envelope it until it is selected. The systems and methods of this invention provide for accurately printing without selecting the page size (see FIG. 8).

Figure 8:
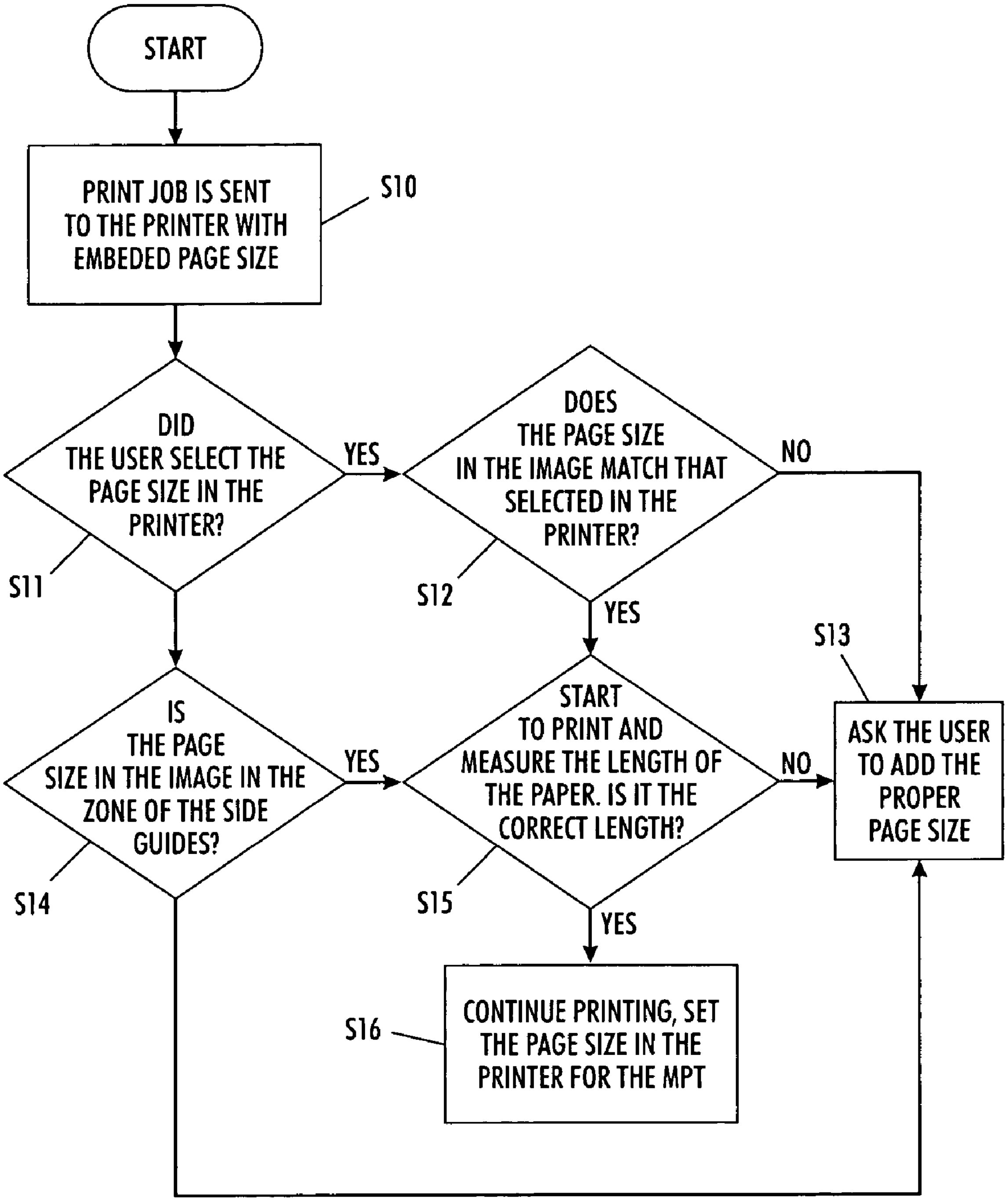
FIG. 8 is a flowchart showing printing on a desired media without selecting the media intended to be printed upon, according to this invention.

FIG. 8 is a flowchart showing printing on a desired media size without manually selecting the media intended to be printed upon. As shown in FIG. 8, the process begins at the start and continues to step S10 where the print job (image file) having an embedded page size is sent to the printer 20. In this embodiment, the embedded page size may be sent with the image file of the print job as part of the page content in a page description language. The procedure continues to step S11 where it is determined if the user has selected a page size in the printer 20. If the user has selected a page size, the process continues to step S12 where it is determined whether the page size in the image file matches that selected in the printer 20. If the page size in the image file does not match that selected in the printer 20, the process continues to step S13 where a message is sent from the printer 20 to the user requesting that the user load the proper media in the printer.

If the user has not selected the page size in the printer 20 at step S11, the process continues to step S14 where it is determined if the page size in the image file is in the zone of the current position of the side guides 24. If the page size is not in the zone of the side guides 24 the process continues to step S13 where the user is asked to add the proper media to the printer 20. If it is determined at step S14 if the page size in the image is in the zone of the side guides 24, the procedure continues to step S15 where the printing procedure is started and the length of the paper is measured. If the page length is correct, printing continues at step S16, and the page size is set in the printer 20 for the MPT 22. If the paper is not of the correct length, the procedure continues to step S13 where the user is requested to load the proper media into the printer 20.

Although this example describes determining a desired page size by an embedded page size tag, or other PDL method, the desired page size may also be discerned by any other known or to be developed method.

Figure 9:
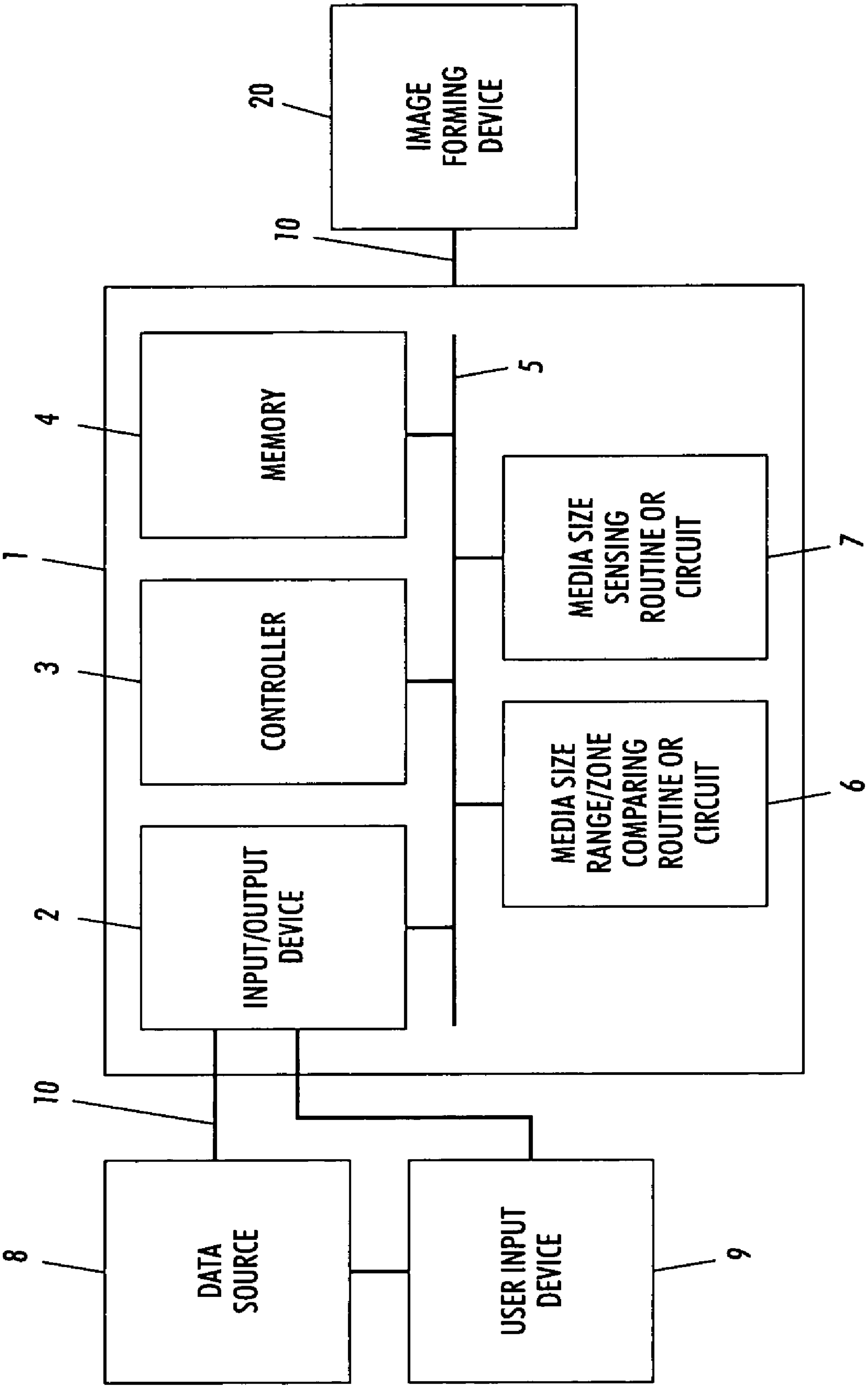
FIG. 9 is a block diagram of an exemplary embodiment of a media size sensing system, according to this invention.

FIG. 9 is a block diagram of an exemplary embodiment of a media size sensing system according to this invention. As shown in FIG. 9, a media size sensing system 1 includes, an input/output interface 2, a controller or processor 3, a memory 4, and a bus 5.

The memory 4 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-writable optical disk and disk drive, a hard drive, flash memory or the like. Similarly, the non-alterable or fixed memory can be implemented using any one or more or ROM, PROM, EPROM, EEPROM, an optical ROM disk, such as a CD-ROM or DVD-ROM disk and disk drive or the like.

Each of the input/output interface 2, controller 3, and memory 4 are connected via the bus 5. The media size sensing system 1 also includes a media size range/zone comparing routine or circuit 6 connected to the bus 5, as well as a media size sensing routine or circuit 7 connected to the bus 5.

It should be understood that each of the circuits 6, 7 can be implemented as firmware, hardware, or software. Alternatively, each of the circuits 6, 7 can be implemented as physically distinct hardware circuits within an ASIC, or using a FPGA, a PLD, a PLA or a PAL, or using discrete logic elements or discrete circuit elements.

A data source 8 and a user input device 9, are each in communication with the input/output interface 2 of the media size sensing system 1 via a link 10. The link 10 can be any known or later-developed device or system for connecting the media size sensing system 1 to the data source 8 and user input device 9, including a direct cable connection, a connection over a wide area network or a local area network, a connection over an intranet, a connection over the Internet, or a connection over any other distributed processing network or system. In general, the link 10 can be any known or later-developed connection system or structure usable to it connect the data source 8 and user input device 9 to the media size sensing system 1.

A user using the user input device 9 sends an image file retrieved from the data source 8 to the image formation device 20. The data source 8 can be any known or to be developed data source. For example, the data source 8 may be a digital camera, a scanner, or a locally or remotely located computer, or any other known or later-developed device that is capable of generating electronic image data. Similarly, the data source 8 can be any suitable device that stores and/or transmits electronic image data such as a client or a server of a network. The data source 8 can be integrated with the image formation device 20, as in a digital copier or a printer. Alternatively, the data source 8 can be connected to the image formation device 20 over a connection device, such as a modem, a local area network, a light area network, an intranet, the Internet, or any other distributed processing network, or any other known or later-developed connection device.

It should also be appreciated that, while the electronic image data can be generated at the time of printing an image from an original document, the electronic image data could have been generated at any time in the past. Moreover, the electronic image data need not have been generated from the original physical document, i.e., such as a scanner, but could have been created from scratch electronically. The data source 8 is thus any known or later-developed device which is capable of supplying electronic data over the link 10 to the image formation device 20. The link 10 can just be any known or later-developed system or device for transmitting the electronic image data from the data source 8 to the image formation device 20.

In an exemplary embodiment of this invention, firmware, incorporated in the media size sensing system 1 included in the image formation device 20, receives the image file via the input/output interface 2 via a link 10. The controller 3 sends and stores the media or page size included with the image file to the memory 4 via the bus 5. The controller 3 also sends a request to the media size sensing routine or circuit 7 to determine the size of the media loaded in the MPT 22. The media size sensing routine or circuit 7 detects the size of the media loaded in the MPT 22 according to the position of sensors 30 associated with the side guides 24. The size, or width of the loaded media is determined as described above. The detected media size is then stored in the memory 4 via the bus 5. The detected media size is also sent to the media size range/zone comparing routine or circuit 6 via the bus 5. At the media size range/zone comparing routine or circuit 6, a determination is made as to the zone or range which the sensed media size would be within. The chosen range or zone is then compared to the media size of the image file stored in the memory 4 and the media size detected in the image formation device 20, that has also been stored in the memory 4. Thus, a user does not have to manually input the dimensions of the media size reducing the possibility for incorrectly selecting media size thereby causing degradation in the image formation device 20 or the print job due to excess ink being deposited within the image formation device 20.

If the "range" is determined to be acceptable, the image is printed according to the page size in the image file, or print job, and sent to the image formation device 20. When the first sheet is run (printed), the length of the sheet is checked to verify the page size. In the event the page size in the image file does not correspond to the media loaded in the MPT 22, a message is generated to notify the user of an incompatible media size and the print job is not run. In various exemplary embodiments, the message may be displayed on the printer display 27 or a display at the users work station (not shown).

The media size sensing system 1 may be implemented as firmware resident in the, or image formation device 20. Alternatively, the media size sensing system 1 may be implemented as software, hardware, or the like.

Figure 10:
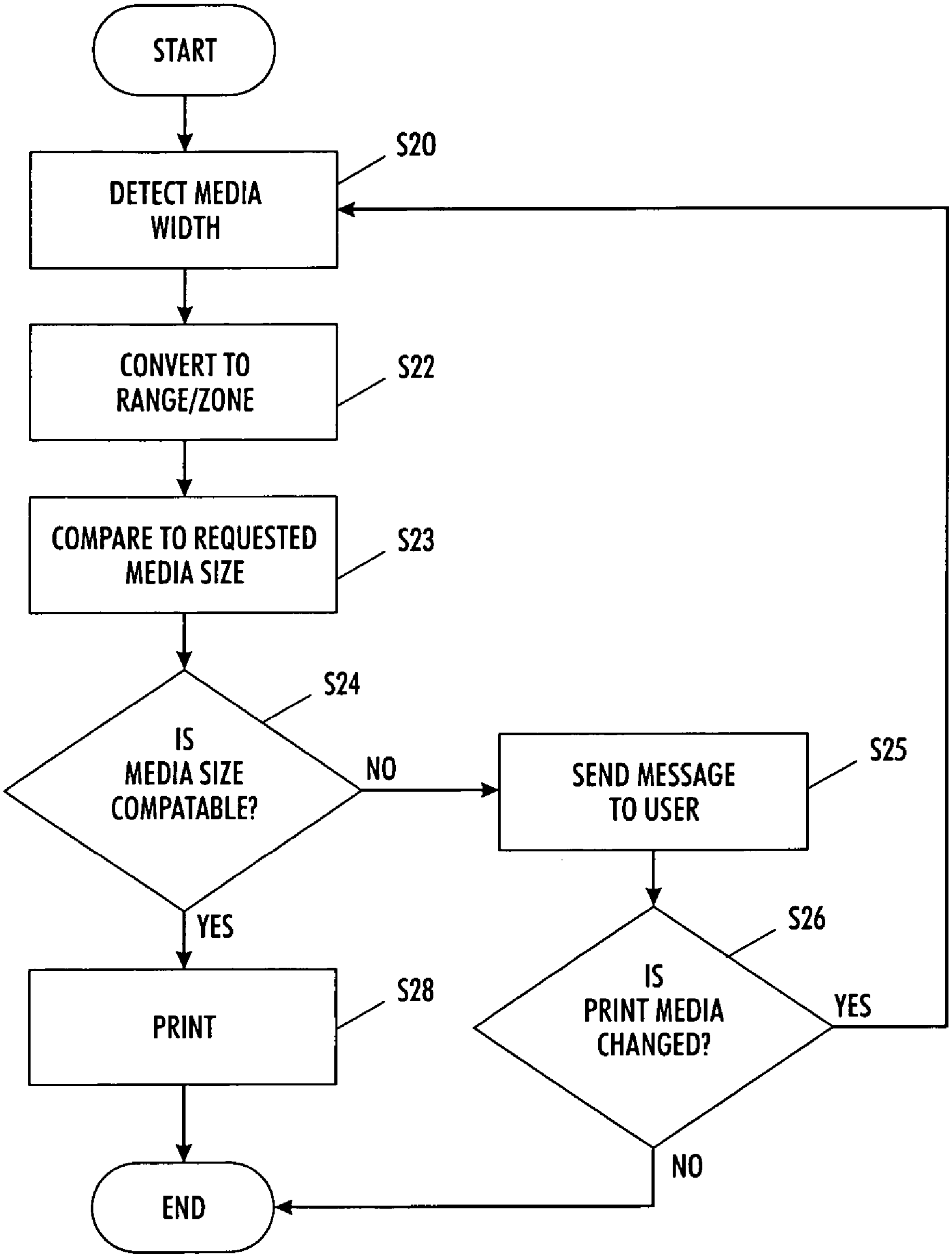
FIG. 10 is a flowchart outlining an exemplary embodiment of a method for media size sensing, according to this invention.

FIG. 10 is a flowchart outlining an exemplary embodiment of a method for media size sensing according to this invention. As shown in FIG. 10, the process begins at the start and continues to step S20 where the media size detected in the paper tray of the printer is performed. The procedure continues to step S22 where the detected media size is converted into a range or zone. The range or zone is then compared to the media size included with the image file at step S23. It is determined if the media size is compatible at step S24. If the media size of the image file is within the detected range or zone of the media loaded in the printer, i.e., compatible, the procedure continues to step S28 where the print job is run then the procedure ends. If the media size of the image file does not fall within the range or zone of the media loaded in the printer, a message is sent to the user at step S25 notifying the user of an incompatible paper or media size loaded in the printer. The procedure continues to step S26 where it is determined if the print media in the printer has been changed. If the print media has been changed, the procedure continues to step S20 to detect the width of the media loaded in the tray and the process continues as described above to step S23 to compare the media loaded in the printer with that of the media size required by the image file at step S23. If the media size loaded in the printer compares acceptably to that of the image file, the procedure continues to step S28 where the print job is run and then the procedure ends. If the system does not detect that the print job is terminated and the procedure ends.

Although this as been described in conjunction with the exemplary embodiments outlined above, various alternatives, modifications, variations, improvements, and/or substantial equivalents, whether known or that are or may be presently unforeseen, may become apparent upon reviewing the foregoing disclosure. Accordingly, the exemplary embodiments of the invention, as set forth above, are intended to be illustrative, not limiting. Various changes may be made without departing from the spirit and scope of the invention.

What is claimed is:

1. A method of preventing incorrect media size selection in an image formation device, comprising:

detecting, with at least one side guide, a width dimension of print media disposed in the image formation device by a position of the at least one side guide of a media storage area;

in a media size sensing routine or circuit, converting the position of the at least one side guide to a value corresponding to the width dimension of the print media;

in a media size comparing routine or circuit, comparing the converted value to a plurality of predetermined groups of media having respective ranges of width dimensions and determining a predetermined group of media having a width dimension within a predetermined range of the converted and value;

determining whether the image formation device performs a function based on the comparison of the converted value to the predetermined group of media; determining a number of media in a predetermined group of media having a width dimension within a predetermined range of the converted value; determining whether the at least one side guide has been located at a current position previously when there are two or more media in the predetermined group of media; determining whether a metric measurement default is in an ON or an OFF position; and selecting from the predetermined group of media a most frequently selected print media having a metric measurement when the metric measurement is in the ON position.

2. The method of claim 1, further comprising a media display device for displaying the predetermined group of media that corresponds to the converted value of the image formation device.

3. The method of claim 2, further comprising a media size comparing routine or circuit for selecting one of the displayed predetermined group of media corresponding to the print media disposed in the image formation device.

4. The method of claim 1, further comprising a media size comparing routine or circuit for defaulting to a custom media size when the number of media in the predetermined group of media is zero.

5. The method of claim 1, further comprising a media size comparing routine or circuit for defaulting to a standard media size when the number of media in the predetermined group of media is one.

6. The method of claim 1, further comprising a media size comparing routine or circuit for selecting from the predetermined group of media a most frequently selected print media having an English measurement when the metric measurement default is in the OFF position.

7. The method of claim 1, further comprising:

receiving an image file containing a required print media width dimension at the image formation device;

comparing the required print media width dimension to the converted value; and executing a print request of the image file based on a comparison between the required print media width dimension of the image file and the converted value.

8. The method of claim 1, further comprising generating and displaying a message on the image formation device based on the comparison between the required media width dimension of the image file and the converted value.

9. An image formation device having a media size sensing system for preventing incorrect media size selection, the image formation device comprising:

a media storage area for storing media, the media storage area having at least one adjustable media guide disposed thereon, and at least one sensor associated with the adjustable media guide to determine a position of the at least one adjustable media guide;

a media size sensing routine or circuit that converts a position signal received from the at least one sensor into a value corresponding to a dimension of the print media; and a media size comparing routine or circuit that compares the value to a plurality of predetermined groups of media having respective ranges of width dimensions, determines a predetermined group of media having a dimension within a certain range of the value, determines whether the image formation device performs a function based on the comparison of the value to the predetermined group of media, determines a number of media in a predetermined group of media having a width dimension within a predetermined range of the converted value; determines whether the at least one side guide has been located at a current position previously when there are two or more media in the predetermined group of media; determines whether a metric measurement default is in an ON or an OFF position;

and selects from the predetermined group of media a most frequently selected print media having a metric measurement when the metric measurement is in the ON position.

10. The image formation device according to claim 9, further comprising a display, wherein the group of predetermined media sizes is displayed on the display for selection by a user.

11. The image formation device according to claim 9, further comprising a processor that receives and processes an image file, including a required print media width dimension, wherein the image formation device executes a print function of the image file based on the comparison of the value to the required print media width dimension.

12. The image formation device according to claim 11, further comprising a display, wherein a message is generated and displayed on the display based on the comparison of the value to the required print media width dimension.

13. An image formation device, comprising:

a controller that controls:

detecting a width dimension of print media disposed in the image formation device by a position of at least one side guide;

converting the position of the at least one side guide to a value corresponding to the width dimension of the print media;

comparing the converted value to a plurality of predetermined groups of media having respective ranges of width dimensions;

determining a number of media in a predetermined group of media having a width dimension within a predetermined range of the converted value;

determining whether the at least one side guide has been located at a current position previously when there are two or more media in the predetermined group of media;

determining whether a metric measurement default is in an ON or an OFF position;

selecting from the predetermined group of media a most frequently selected print media having a metric measurement when the metric measurement is in the ON position; and determining whether the image formation device performs a function based on the comparison of the converted value to the predetermined group of media.

14. The image formation device of claim 13, wherein the controller further controls receiving an image file containing a required print media width dimension at the image formation device;

comparing the required print media width dimension to the converted value; and executing a print request of the image file based on a comparison between the required print media width dimension of the image file and the converted value.

15. The image formation device of claim 14, wherein the controller further controls generating and displaying a message on the image formation device based on the comparison between the required media width dimension of the image file and the converted value.

16. A computer readable medium containing a computer program for enabling the prevention of incorrect media size selection in an image formation device, the computer program comprising instructions to:

detect a width dimension of print media disposed in the image formation device by a position of at least one side guide;

convert the position of the at least one side guide to a value corresponding to the width dimension of the print media;

compare the converted value to a plurality of predetermined groups of media having respective ranges of width dimensions and determine a predetermined group of media having a width dimension within a predetermined range of the converted value;

determine whether the image formation device performs a function based on the comparison of the converted value to the predetermined group of media;

determine a number of media in the predetermined group of media having a width dimension within a predetermined range of the converted value;

determine whether the at least one side guide has been located at a current position previously when there are two or more media in the predetermined group of media;

determine whether a metric measurement default is in an ON or an OFF position;

select from the predetermined group of media a most frequently selected print media having a metric measurement when the metric measurement is in the ON position;

compare a required print media width dimension to the converted value; and execute a print request of the image file based on a comparison between the required print media width dimension of the image file and the converted value.

* * * * *